US005706161A

United States Patent [19]

Adam

[11] Patent Number: 5,706,161

[45] Date of Patent: Jan. 6, 1998

[54] OPEN CIRCUIT PROTECTION DEVICE

[76] Inventor: Russell William Adam, 29/134 The Grande Parade, Brighton-le-sands, New South Wales, 2216, Australia

[21] Appl. No.: 619,692

[22] PCT Filed: Sep. 29, 1994

[86] PCT No.: PCT/AU94/00587

§ 371 Date: May 31, 1996

§ 102(e) Date: May 31, 1996

[87] PCT Pub. No.: WO95/09468

PCT Pub. Date: Apr. 6, 1995

[30] Foreign Application Priority Data

Sep. 29, 1993 [AU] Australia ............................... PM 1521
Jun. 20, 1994 [AU] Australia ............................... PM 6351

[51] Int. Cl.[6] ........................................ H02H 1/00

[52] U.S. Cl. ............................ 361/124; 361/86; 337/17

[58] Field of Search ...................... 361/56, 86, 117–121, 361/123–126; 338/21; 337/19–20, 17–18, 15

[56] References Cited

U.S. PATENT DOCUMENTS

| | | | |
|---|---|---|---|
| 2,179,935 | 11/1939 | Kayatt | 337/19 |
| 2,216,974 | 10/1940 | Hogan | 337/17 |
| 3,026,392 | 3/1962 | Louret | 200/118 |
| 4,275,432 | 6/1981 | Napiorkowski | 361/124 |
| 4,355,345 | 10/1982 | Franchet | 361/117 |
| 5,155,649 | 10/1992 | Hung et al. | 361/119 |

FOREIGN PATENT DOCUMENTS

| | | |
|---|---|---|
| 0064016 | 11/1982 | European Pat. Off. . |
| 1409807 | 7/1964 | France . |
| 3110418 | 9/1982 | Germany . |
| 3531079 | 4/1986 | Germany . |
| 54-49550 | 4/1979 | Japan . |
| 54-57143 | 8/1979 | Japan . |
| 54-137647 | 10/1979 | Japan . |
| 2183049 | 5/1987 | United Kingdom . |
| 93/09584 | 5/1993 | WIPO . |

OTHER PUBLICATIONS

Patent Abstracts of Japan, E–118, p. 27, JP, A, 54–49550 (Mitsubishi Denki K.K.) 18 Apr. 1979.

Patent Abstracts of Japan, E–161, p. 86, JP, A, 54–137647 (Mitsubishi Denki K.K.) 25 Oct. 1979.

Patent Abstracts of Japan, E–121, p. 127, JP, A, 54–57143 (Mitsubishi Denki K.K.) 8 May 1979.

*Primary Examiner*—Jeffrey A. Gaffin
*Assistant Examiner*—Michael J. Sherry
*Attorney, Agent, or Firm*—Ladas & Parry

[57] ABSTRACT

A protection device which includes an insulating tube closed at each end by a fuse cap. Electrically connected to one cap is a contact plug, and to the other cap a spring and a contact plunger. Sandwiched between the plug and the plunger is a combustible separator configured to disintegrate when the potential difference between the plug and the plunger exceeds a predetermined amount. This disintegration permits the spring to bias the plug and the plunger into electrical connection thus eliminating the potential difference. The protection member contains an accelerant to increase its rate of disintegration. The device is used to protect neon lighting systems from open circuits.

13 Claims, 3 Drawing Sheets

100
101
102
103
104
105
106
107
108
109
110
111
112
113
114
115
116
117
118
119
120
121
122
123
124
125
126
127
128
129
130
131
132
133

OPEN CIRCUIT PROTECTION DEVICE

FIELD OF THE INVENTION

The present invention relates to protection devices for electrical systems and, in particular, discloses a device which protects against hazardous conditions that arise through open circuits.

BACKGROUND ART

In the neon lighting industry, high tension (HT) transformers are used to supply a high voltage, typically about 15 kV, to a glass tube filled with an inert gas so as to provide illumination. Problems arise with the use of such transformers when the high tension output thereof becomes open circuit, typically due to breakage of glass tubing or through a disconnection of one or more high tension supply leads. When an open circuit occurs, the output potential of the HT winding increases dramatically and, over a period of time, typically between thirty minutes and six hours, a substantial temperature rise within the transformer can cause the transformer to fail. Where the HT output is not contained within a completed circuit, the high tension presents a fire hazard to nearby materials.

It is known to use an electronic open circuit monitor arranged at the primary winding of the high tension transformer to overcome this problem. Such a monitor is configured to identify a drop in primary winding current corresponding to the high tension secondary winding going open circuit. Upon detecting the drop, the open circuit monitor electronically disconnects the primary thereby removing any potential difference from the outputs of the secondary winding. However, such electronic devices, whilst effective, are often in practice difficult to calibrate and are relatively expensive in terms of their component count and complexity.

SUMMARY OF THE INVENTION

It is an object of the present invention to substantially overcome, or ameliorate, the abovementioned difficulties through provision of an alternative open circuit protection device.

In accordance with one aspect of the present invention there is disclosed a protection device for electrical systems, the device comprising an insulating member enclosing first and second electrical contact pieces separated by a protection member, and a biasing member for biasing at least the first contact piece to sandwich the protection member between said contact pieces, wherein the protection member is configured to disintegrate upon a predetermined potential difference being reached between the contact pieces, the disintegration of the protection member permitting the biasing member to force the contact pieces into contact thereby eliminating any potential difference therebetween.

Generally, the electrical system is a gas-filled tube lighting arrangement supplied via a high tension transformer, and at least one of the protection devices is connected between a high tension output of the transformer and earth, and is configured to withstand a normal load operating high voltage of the transformer, but to disintegrate when subjected to a no-load high-voltage caused by the high tension output going open-circuit.

Preferably, the protection member is either rigid or resilient and is configured to combust as the predetermined potential difference is applied across it. Generally, the length of the protection member determines the minimum potential difference it can withstand prior to disintegration. Also preferably the protection member can be supplemented by an accelerant which acts to increase its rate of disintegration.

BRIEF DESCRIPTION OF THE DRAWINGS

A number of preferred embodiments of the present invention will now be described with reference to the drawings in which.

BEST AND OTHER MODES FOR CARRYING OUR THE INVENTION

Figure 1:
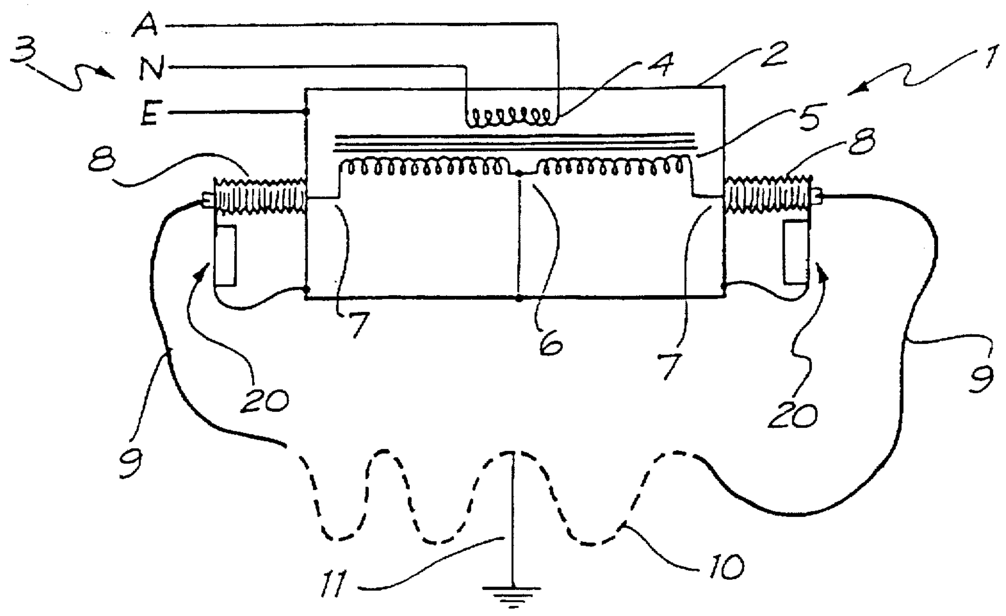
FIG. 1 is a schematic view of a lighting system which incorporates two open circuit protectors of a first embodiment.

Referring to FIG. 1, a neon lighting system 1 is shown which includes a high tension (HT) transformer 2 supplied by a mains supply 3 to a primary winding 4 of the transformer 2. The mains supply 3 includes an active (A) and neutral (N) conductor which connect to the primary winding 4, and an earth conductor (E) which connects to a chassis or casing of the transformer 2.

The transformer 2 includes a HT secondary winding 5 having a centre tap 6 connected to earth via the chassis of the transformer 2. The secondary winding 5 includes two HT outputs 7 which pass via ceramic insulators 8 to corresponding high tension leads 9 that supply a gas filled lighting robe 10, commonly known in the art as neon robing. Generally, an earth connection 11 is provided at a central location of the tubing 10.

As shown in FIG. 1, two open circuit protectors 20 are connected between an output terminal of the ceramic insulator 8 and earth (E) via the chassis of the transformer 2.

Figure 2:
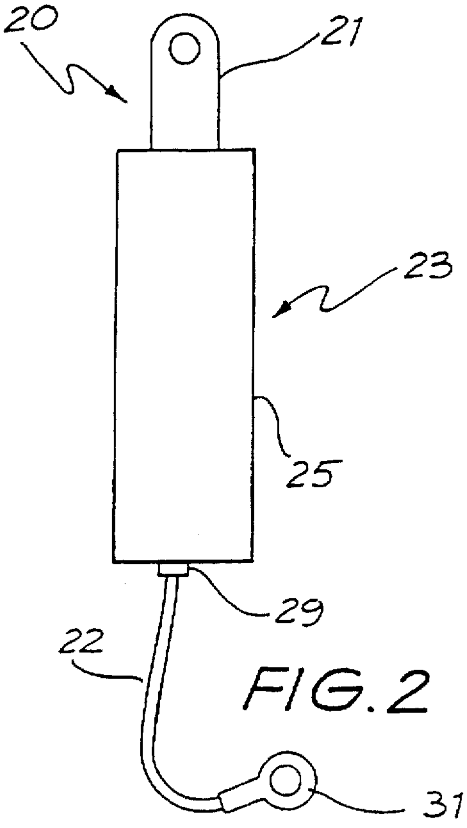
FIGS. 2 and 3 are plan and inverse plan views of one of the open circuit protectors shown in FIG. 1.
Figure 3:
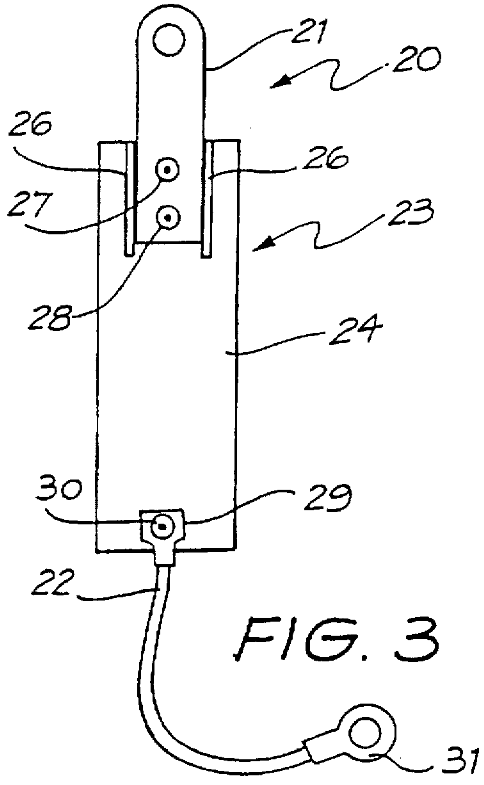

Turning now to FIGS. 2 and 3, the open circuit protector 20 includes a body 23 comprising an insulating base 24 and an insulating cover 25. Extending from the base 24 at one end thereof is a tab connector 21 which is arranged for connection to one of the ceramic insulators 8. The tab connector 21 is located between two guides 26 and is fastened to the base 24 by two rivet fasteners 27 and 28.

Arranged at the opposite end of the open circuit protector 20 is a flying lead 22 which connects via a tab 29 fastened by a rivet fastener 30. Arranged at the distal end of the flying lead 22 is a connection lug 31 which provides for interconnection with the chassis of the transformer 2 in the usual manner using a nut and bolt or screw type arrangement.

Figure 5:
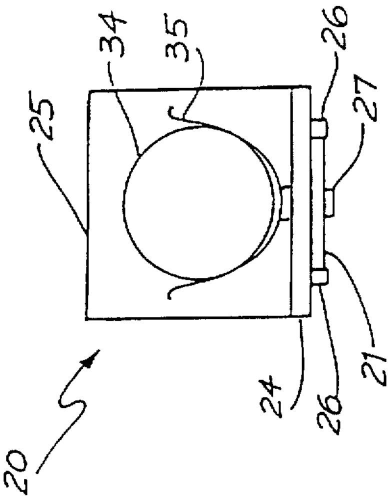
FIG. 5 is an end elevation view of the arrangement of FIG. 4.
Figure 4:
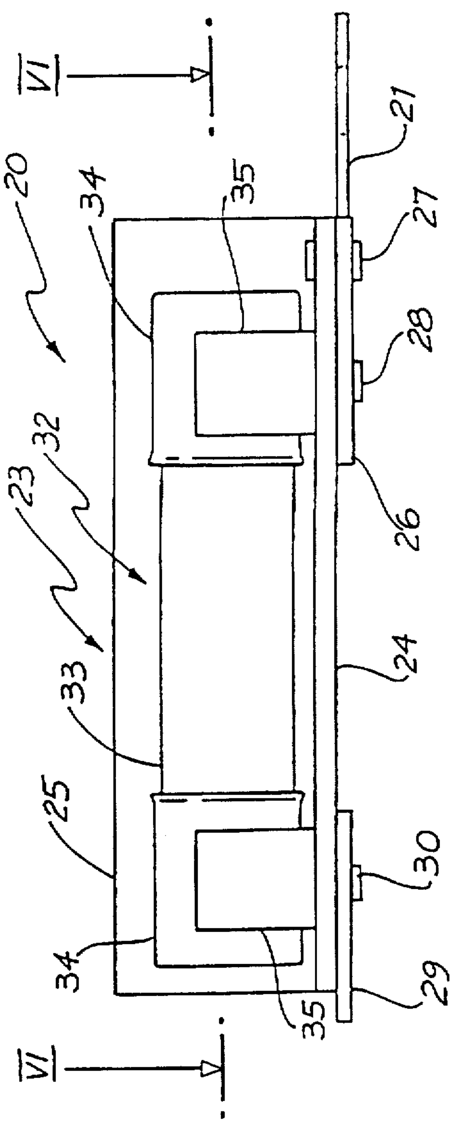
FIG. 4 is a side elevation view showing the interior of the open circuit protector of FIGS. 2 and 3.

As shown in FIGS. 4 and 5, the cover 25 and base 24 enclose a protection device 32 mounted between two fuse holders 35 which respectively connect to one of the tab connector 21 via the rivet 28, or the tab 29 via the rivet 30. The protection device 32 includes an insulating outer tube 33, typically made of ceramic materials, and a pair of fuse caps 34 configured to close the ends of the tube 33 and to provide electrical interconnection via the fuse holders with the tabs 21 and 29.

Figure 6:
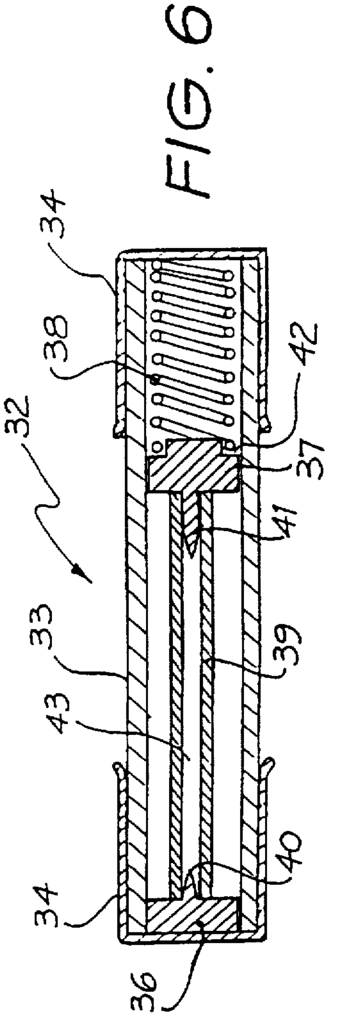
FIG. 6 is a cross-sectional view drawn along the lines VI—VI of FIG. 4.

Turning now to FIG. 6, the protection device 32 includes a contact plug 36, generally manufactured of brass, which is positioned at one end of the tube 33 in electrical contact with an adjacent one of the fuse caps 34.

Arranged within and at the other end of the tube 33 is a compressed spring 38 which electrically contacts the adjacent fuse cap 34 and mates with an annular notch 42 in a contact plunger 37 also manufactured of brass. Disposed between the contact plug 36 and the contact plunger 37 is a tubular combustible separator 39. As seen, the contact plug 36 includes a protrusion 40 and the contact plunger 37 includes a similar protrusion 41 both of which are insertable into the ends of the tubular combustible separator 39, so that the separator 39 is sandwiched between the plug 36 and plunger 37 by the spring 38.

The combustible separator 39 is preferably manufactured of a tube of polypropylene of approximately 3 mm in diameter and of a length of between 15 to 20 mm. Such dimensions of the separator 39 provide for operation with a transformer 2 having a 15 kV centre tapped secondary winding 5. Accordingly, the separator 39 is adapted to withstand a nominal potential of 7.5 kV but to combust or disintegrate at a predetermined voltage in excess of this value which is not experienced under normal operating conditions of the lighting system 1. Generally, for neon lighting systems, a length of polypropylene tubing between 5 mm and 25 mm is appropriate for the range of voltages used in such systems. The use of polypropylene is advantageous as this material is rigid and does not contain a fire retardant which, if present, may cause mis-operation of the open circuit protector 20.

In operation, under normal operating conditions, the potential difference across the separator 39 is approximately 7.5 kV. When the secondary winding 5 goes open circuit, either through a breakage of the glass tubing 10 or a disconnection of either one of the leads 9, the potential difference between the contact plug 36 and contact plunger 37 will rise. As the potential differences rises, an air gap 43 confined within the separator 39 begins to break down and as this occurs, the separator 39 combusts to disintegration. The disintegration of the separator 39 permits the spring 38 to force the contact plunger 37 to move into contact with the contact plug 36. This electrically connects HT transformer output to earth thus effectively shorting out one half of the secondary winding 5 which thereby causes the transformer 2 to output a short circuit current.

Such a situation is tolerable in high tension transformers as they are configured to operate to illuminate gas filled glass tubing when supplying 80% of their full load current whereby a short circuit or starting current represents 100% of the full load capability. In this manner, the transformer 2 can operate indefinitely in a shorted configuration until such time as the system fault can be rectified.

Figures 7, 8, 9:
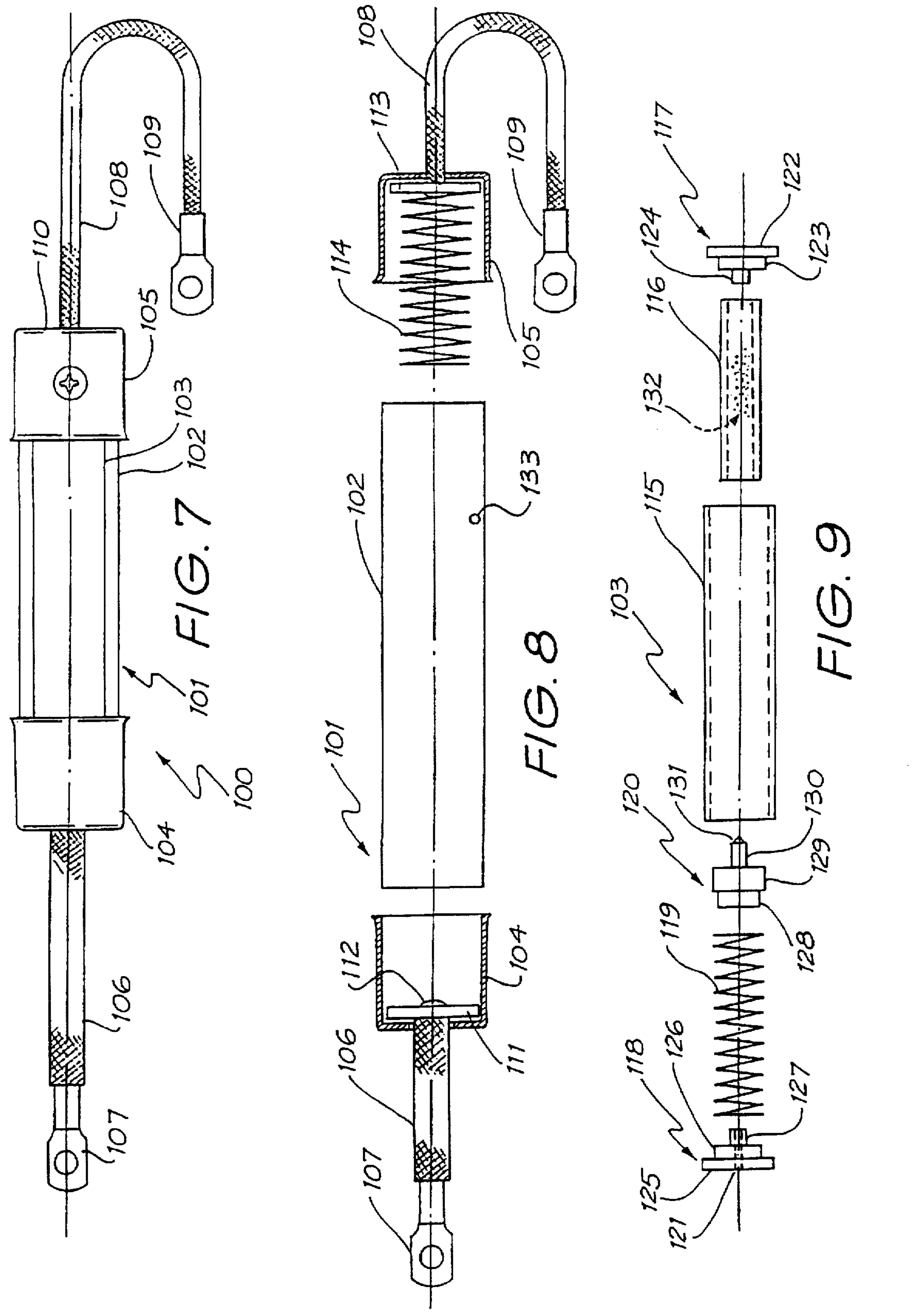
FIG. 7 is a side view of an open circuit protection device (OCPD) of a second embodiment.
FIG. 8 is an exploded representation of the carrier of the OCPD of FIG. 7.
FIG. 9 is an exploded representation of the OCP element used in the OCPD of FIG. 7.

Turning now to FIGS. 7, 8 and 9, an alternative embodiment illustrating an open circuit protection device (OCPD) 100 is shown which includes a carrier 101 shown in exploded form in FIG. 8 that encloses an OCP element 103 shown in exploded form in FIG. 9.

The carrier 101 includes a polycarbonate tube 102 that is preferably transparent and which is closed at either end by one of two end caps 104 and 105. The end cap 104 encloses a brass washer 111 to which a high voltage cable 106 is soldered to form a solder mound 112. The cable 106 is terminated by a lug connector 107 which facilitates connection to a high voltage terminal of a transformer such as that described in the foregoing embodiment.

The end cap 105 encloses a brass washer 113 to which is soldered each of a bronze spring 114 and an earth cable 108 which extends from the end cap 105. The earth cable 108 terminates in a lug connector 109 which facilitates connection to an earth point of the electrical system of which the OCPD 100 forms a part thereof. The spring 114 is configured to extend into the tube 102 so as to sandwich the OCP element 103 in electrical contact between the free end of the spring 114 and the solder mound 112.

The OCP element 103 includes a tubular support 115 preferably manufactured of non-porous ceramic material which is closed at its ends by a contact closure piece 117 and a conductive piece 118. The contact closure piece 117 includes a flat end plate 122, a locating middle section 123 and a locating centre section 124, each of respective smaller diameters. The end plate 122 is configured to seal the respective end of the support 115 and to permit a glued adhesive join to be formed via the locating middle portion 123 against the interior and end annulus of the tubular support 115. The locating centre 124 is sized to be inserted into a tubular combustible separator 116 which is located within the support 115.

The conductive closure piece 118 is shaped in a similar manner to the contact closure piece 117 and includes an end plate 125, a locating middle portion 126 and a locating centre portion 127. The locating middle portion 126 provides an annular face upon which a bronze spring 119 can reside in electrical contact to bias a plunger 120 against the combustible separator 116. The plunger 120 includes a rear section 128 sized to locate the spring 119 thereabout, a body portion 129, and a protrusion 130 having a pointed tip 131 arranged to be inserted into the corresponding end of the combustible separator 116. The conductive closure piece 118 is adhered to the support 115 in the same manner as the contact closure piece 117 preferably using an adhesive rated to withstand temperatures up to 135° Celsius.

In this embodiment, the OCP element 103 includes an accelerant 132 arranged within the tubular combustible separator 116 and configured to act as an accelerant in the combustion thereof. Preferably, the accelerant 132 is a solid propellent material such as used in ammunition and the like, examples of which include grains or flakes used in shotgun rounds. A particular example is product number AS30N manufactured by Australian Defence Industries. It is preferred that the accelerant 132 not contain any graphite, as graphite would act to decrease the electrical resistance of the separator 116. So as to assist in the combustion of the separator 116, the conductive closure piece 118 has a centrally located hole 121 which permits air to communicate from within the carrier 101 into the support 115. The air entry acts to assist in the combustion of the separator 116, and the hole 121 also acts to exhaust combustion gases to atmosphere which also increases the rate of combustion. A similar hole 133 is provided in the tube 102 to assist the expansion of combustion gases by allowing gaseous communication with atmosphere.

Like the previous embodiment, the combustible separator 116 is manufactured of materials able to continuously withstand a relatively high potential difference, but to disintegrate or combust once the potential difference applied across it exceeds a predetermined amount. In this manner, the separator 116 can be manufactured of paper or any other material with significant insulative properties. However, as before, it is preferred that the separator 116 be manufactured of a tube of polypropylene having a length between 5 and 25 mm but most preferably between 9 and 15 mm. A specific embodiment for use with a 15 kV secondary winding is 14.2 mm long. The tube of polypropylene is preferably of an outside diameter of approximately 4 mm and an inside diameter of approximately 3 mm thereby having an annular thickness of about 1 mm. The accelerant 132 acts to greatly increase the rate at which the separator 116 combusts, which permits the spring 119 to force the plunger 120 into electrical contact with the contact closure piece 117. Without the accelerant, the operating time of the OCPD 100 is of the order of 500 milliseconds. With the aid of the accelerant 132, the operating time is of the order of microseconds. The adhesive used to secure the closure pieces 117 and 118 must also have long term stability, preferably be ultra-violet resistant as well as being humidity resistant. The end caps 104 and 105 are preferably manufactured from polyvinylchloride (PVC).

In a further embodiment (not illustrated), the contact plugs 36, 120 can be physically associated with a microswitch configured to disconnect the primary winding 4 of the transformer 2 when struck by the contact plunger 37. Such an arrangement provides a further level of protection similar to that of the electronic circuitry of the prior art device.

The foregoing describes only a number of embodiments of the present invention and modifications, obvious to those skilled in the art can be made thereto without departing from the scope of the present invention. For example, whilst polypropylene has been described as suitable for use as the combustible separator 39, other materials of similar electrical and physical characteristics can be used.

What is claimed is:

1. A protection device for electrical systems, the device comprising an insulating member enclosing first and second electrical contact pieces separated by a protection member, and a biasing member for biasing at least the first contact piece to sandwich the protection member between said contact pieces, wherein the protection member is configured to disintegrate upon a predetermined potential difference being reached between the contact pieces, said protection member including an accelerant to increase a rate of disintegration of the protection member, the disintegration of the protection member permitting the biasing member to force the contact pieces into contact thereby eliminating any potential difference therebetween.

2. A protection device as claimed in claim 1, wherein said protection member is tubular, and each of said contact pieces comprises an extension locatable within a corresponding end of said protection member.

3. A protection device as claimed in claim 1, wherein said accelerant comprises a plurality of grains of solid propellant material located within said tubular protection member.

4. A protection device as claimed in claim 1, wherein said protection member comprises material selected from the group consisting of polypropylene and paper.

5. A protection device as claimed in claim 4, wherein said protection member is manufactured from tubular polypropylene having a length of between 5 mm and 25 mm and an annular thickness of about 1 mm.

6. A protection device as claimed in claim 1, further comprising electrically conductive end members that close said insulating member, a first one of said end members contacting one end of said biasing member, said biasing member being electrically conductive and the other end of which contacts said first contact piece, another one of said end members directly contacting said second contact piece.

7. A protection device as claimed in claim 6, wherein at least one of said end members has a through aperture that permits gaseous communication between said protection member and atmosphere.

8. A protection assembly for electrical systems, said assembly comprising:

a protection device comprising an insulating member enclosing first and second electrical contact pieces separated by a protection member, and a biasing member for biasing at least the first contact piece to sandwich the protection member between said contact pieces, wherein the protection member is configured to disintegrate upon a predetermined potential difference being reached between the contact pieces, said protection member including an accelerant to increase a rate of disintegration of the protection member, the disintegration of the protection member permitting the biasing member to force the contact pieces into contact thereby eliminating any potential difference therebetween;

an insulative housing configured to releasably retain said protection device;

a first electrical connector for interconnecting first electrical apparatus with said first contact piece; and a second electrical connector for interconnecting second electrical apparatus with said second contact piece.

9. A protection assembly as claimed in claim 8, wherein at least one of said first and second electrical connectors comprise a flying lead having a distal end lug connector.

10. A protection assembly as claimed in claim 8, wherein at least one of said first and second electrical connectors comprises a tab connector.

11. An electrical system comprising:

first electrical apparatus at a first electrical potential;

second electrical apparatus at a second, different electrical potential; and at least one protection assembly comprising:

a protection device including an insulating member enclosing first and second electrical contact pieces separated by a protection member, and a biasing member for biasing at least the first contact piece to sandwich the protection member between said contact pieces, wherein the protection member is configured to disintegrate upon a predetermined potential difference being reached between the contact pieces and comprises an accelerant that increases a rate of disintegration of the protection member, the disintegration of the protection member permitting the biasing member to force the contact pieces into contact thereby eliminating any potential difference therebetween;

an insulative housing configured to releasably retain said protection device;

a first electrical connector for interconnecting said first electrical apparatus with said first contact piece; and a second electrical connector for interconnecting said second electrical apparatus with said second contact piece.

12. A system as claimed in claim 11, wherein said system is a high tension transformer and said first electrical apparatus comprises a high tension output of said transformer, and said second electrical apparatus comprises an earth connection of said transformer.

13. A system as claimed in claim 12, wherein said transformer forms part of a gas filled tube lighting system.

* * * * *